US012564846B2

(12) United States Patent
Lim

(10) Patent No.: US 12,564,846 B2
(45) Date of Patent: Mar. 3, 2026

(54) VIBRATION MOTOR WITH WASHING NOZZLE

(71) Applicant: Young Kyoun Lim, Incheon (KR)

(72) Inventor: Young Kyoun Lim, Incheon (KR)

(73) Assignee: Young Kyoun Lim, Icheon (KR)

( * ) Notice: Subject to any disclaimer, the term of this patent is extended or adjusted under 35 U.S.C. 154(b) by 240 days.

(21) Appl. No.: 18/697,841

(22) PCT Filed: Oct. 12, 2022

(86) PCT No.: PCT/KR2022/015322

§ 371 (c)(1),
(2) Date: Apr. 2, 2024

(87) PCT Pub. No.: WO2023/075212

PCT Pub. Date: May 4, 2023

(65) Prior Publication Data

US 2025/0001434 A1 Jan. 2, 2025

(30) Foreign Application Priority Data

Oct. 25, 2021 (KR) ........................ 10-2021-0142777

(51) Int. Cl.

| | |
|---|---|
| ***B05B 1/02*** | (2006.01) |
| ***B05B 3/02*** | (2006.01) |
| ***B05B 17/06*** | (2006.01) |
| ***E03D 9/08*** | (2006.01) |

(52) U.S. Cl.

CPC .................. *B05B 1/02* (2013.01); *B05B 3/02* (2013.01); *B05B 17/06* (2013.01); *E03D 9/08* (2013.01)

(58) Field of Classification Search

CPC .. B05B 1/02; B05B 3/02; B05B 17/06; B05B 17/0607; E03D 9/08

USPC ....... 239/102.1, 102.2, 451, 456; 4/443, 448

See application file for complete search history.

(56) References Cited

U.S. PATENT DOCUMENTS

| | | | | |
|---|---|---|---|---|
| 6,510,966 | B1 * | 1/2003 | Perry | B05B 17/06 222/196 |
| 2016/0194859 | A1 * | 7/2016 | Bickerstaffe | B05B 3/02 4/443 |
| 2019/0071856 | A1 * | 3/2019 | Park | B05B 1/14 |
| 2021/0023580 | A1 * | 1/2021 | Lim | E03D 9/08 |

FOREIGN PATENT DOCUMENTS

| | | | |
|---|---|---|---|
| KR | 20-0411530 | B1 | 3/2006 |
| KR | 20-0422546 | A | 8/2006 |

* cited by examiner

*Primary Examiner* — Steven J Ganey
(74) *Attorney, Agent, or Firm* — Goldilocks IP LAW

(57) ABSTRACT

Proposed is a vibration motor with a washing nozzle, wherein the internal structure is simplified by mounting the washing nozzle in an empty space inside a motor housing, thereby mitigating noise during vibration and reducing manufacturing costs to achieve economic efficiency and increase productivity, and a subject can be effectively washed by supplying various cleaning solvents, such as water, oil, powder, air, to the washing nozzle.

7 Claims, 7 Drawing Sheets

[FIG.1]
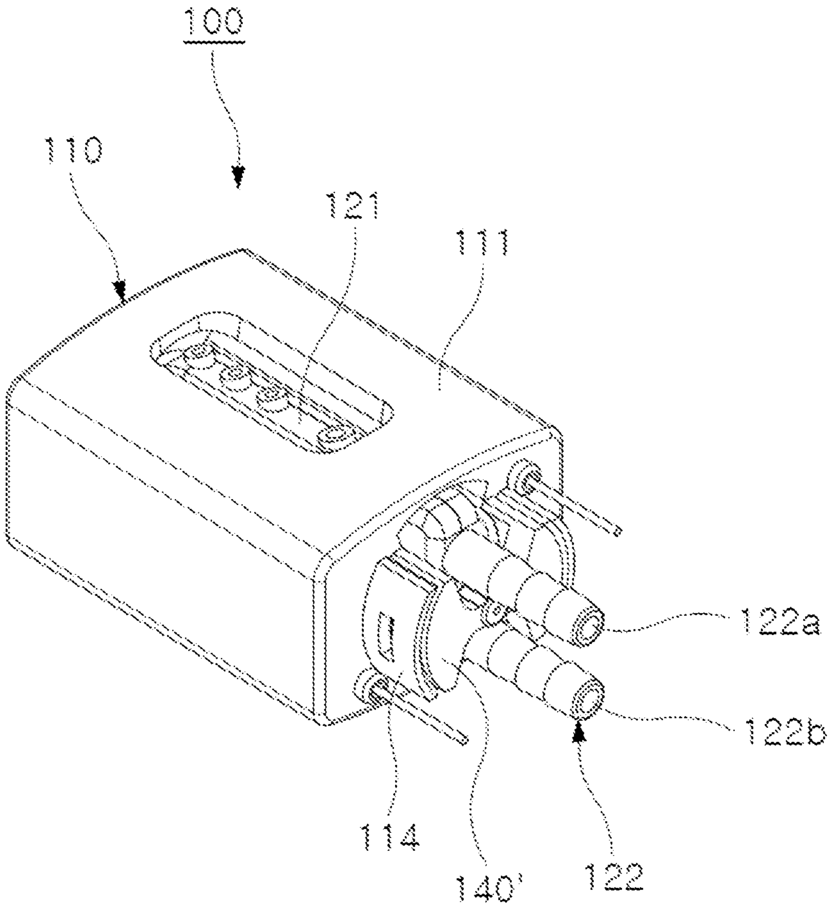

[FIG.2]
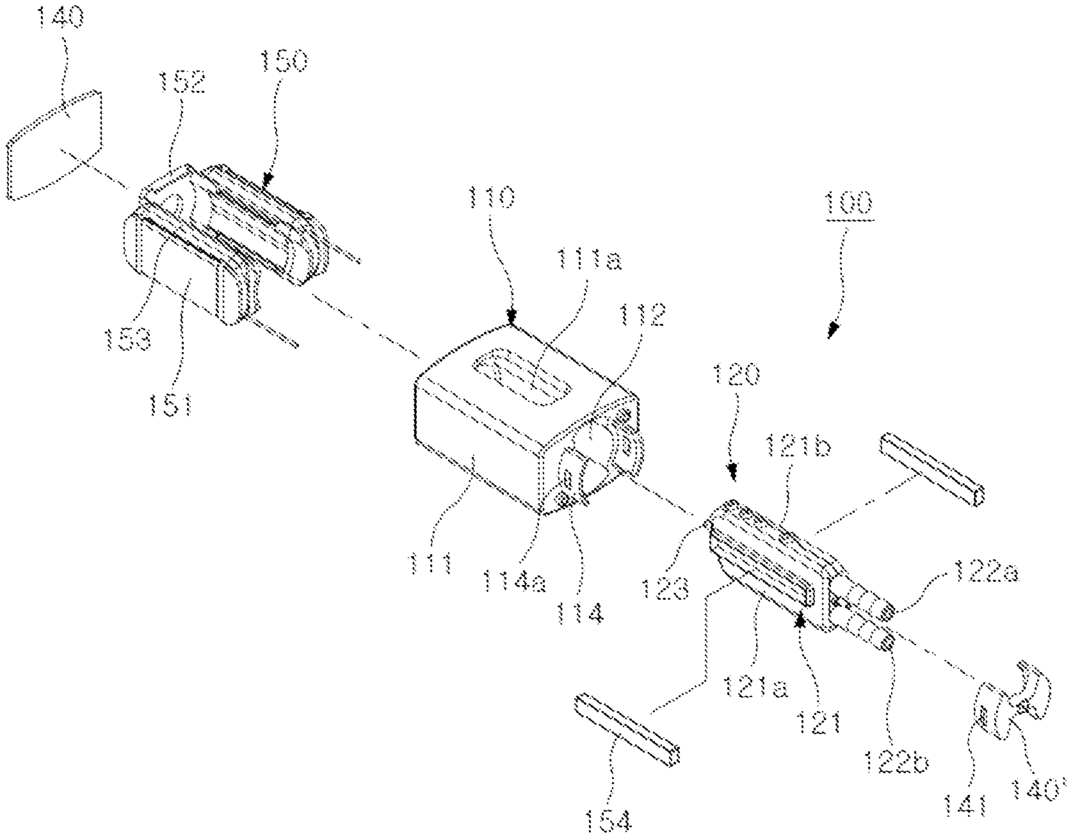

[FIG.3]
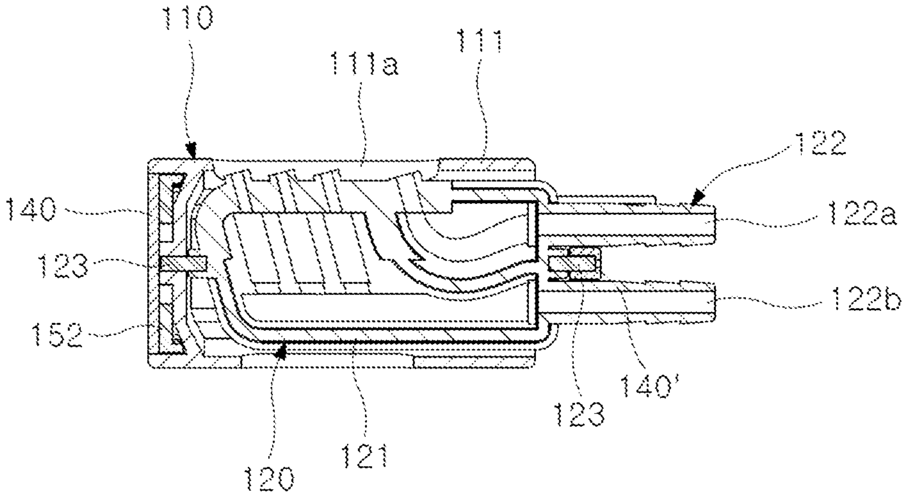

[FIG.4]
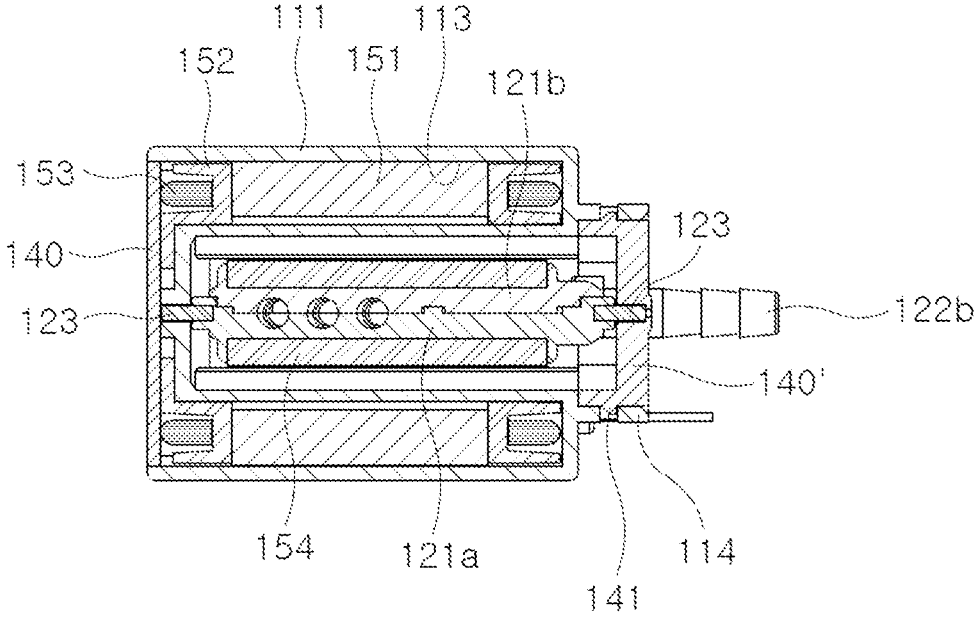

[FIG.5]
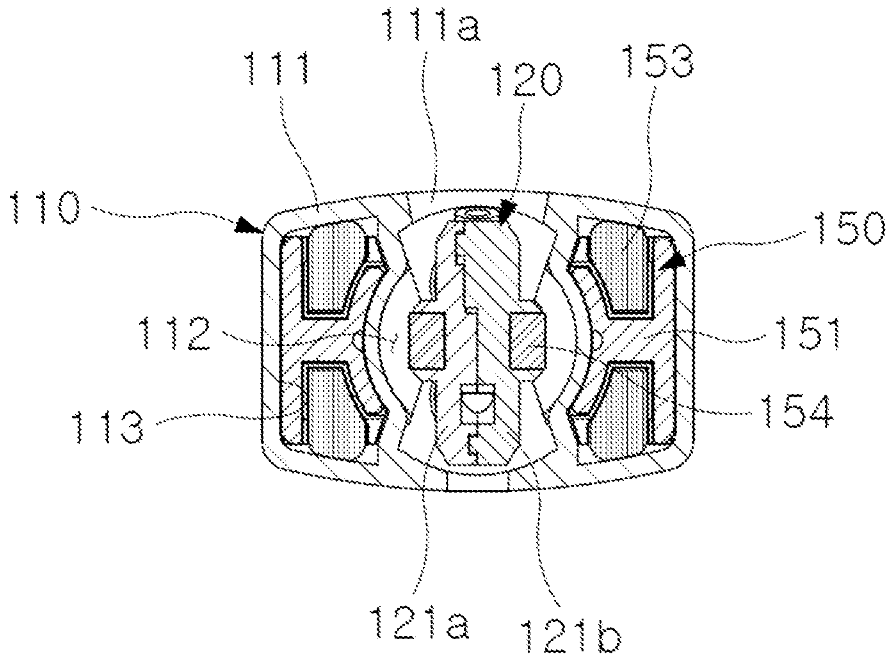

[FIG.6]
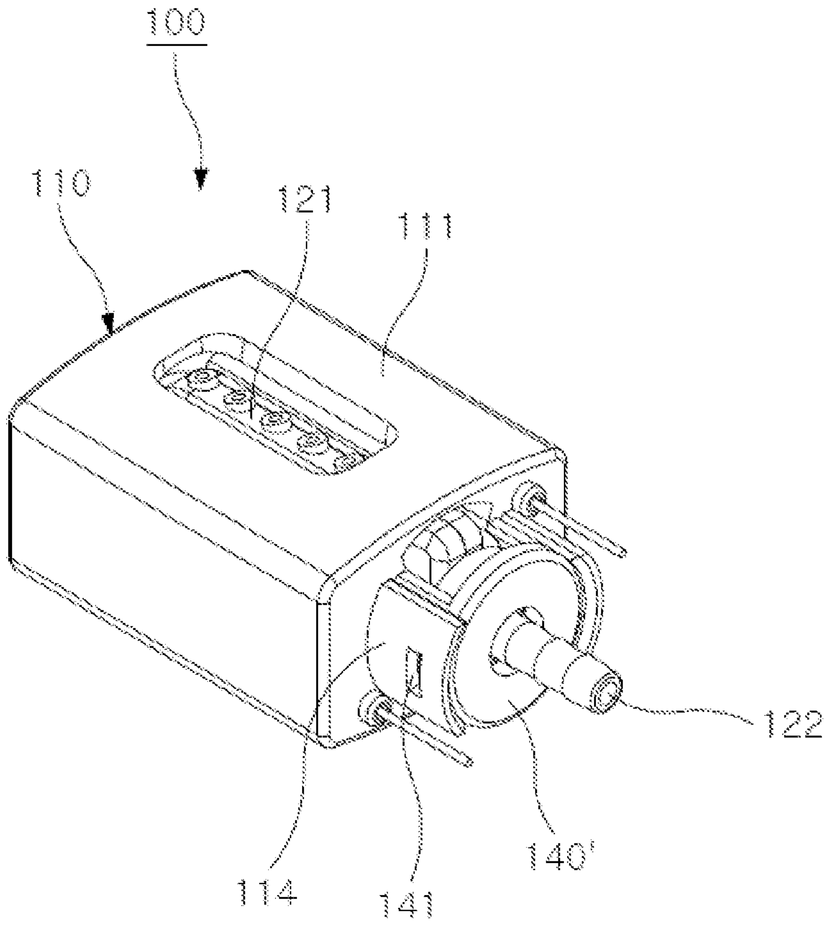

[FIG.7]
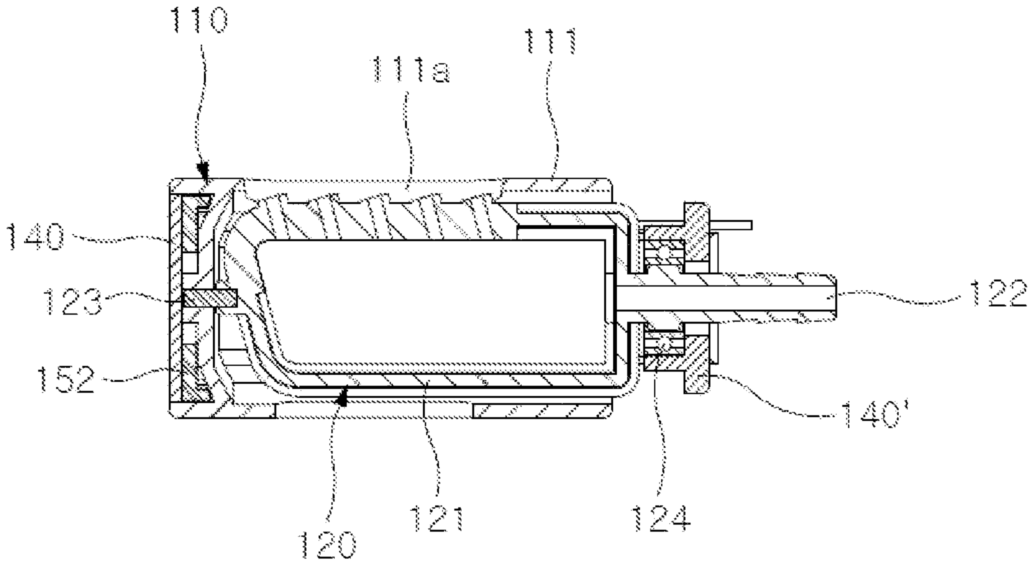

VIBRATION MOTOR WITH WASHING NOZZLE

CROSS-REFERENCE TO RELATED APPLICATIONS

This application claims the benefit under 35 U.S.C. section 371, of PCT International Application No. PCT/KR2022/015322, filed on Oct. 12, 2022, which claims foreign priority to Korean Patent Application No. 10-2021-0142777, filed on Oct. 25, 2021, in the Korean Intellectual Property Office, both of which are hereby incorporated by reference in their entireties.

TECHNICAL FIELD

The present disclosure relates to a vibration motor with a washing nozzle and, more particularly, to a vibration motor with a washing nozzle, wherein the internal structure is simplified by mounting the washing nozzle in an empty space inside a motor housing, thereby mitigating noise during vibration and reducing manufacturing costs to achieve economic efficiency and increase productivity, and a subject can be effectively washed by supplying various cleaning solvents, such as water, oil, powder, air, to the washing nozzle.

BACKGROUND ART

In general, a bidet is installed in a toilet and used to clean the anal and genital areas of the human body. Most bidets come with: an anal wash function, which involves cleaning the anus with cleansing water sprayed through a nozzle after defecation without using toilet paper; a feminine wash function, which is designed to clean a woman's private area with the cleansing water; and a massage function, which achieves a massage effect by moving the nozzle that sprays the cleansing water back and forth repeatedly.

However, in the case of a nozzle provided for cleaning as described above, cleansing water discharged from a cleansing water tank in a bidet is sprayed straight through a spraying hole, and thus the desired area may not be cleaned effectively.

To solve this problem, "STRUCTURE FOR WATER JETTING TIP OF BIDET NOZZLE" has been proposed under Korea Utility Model Registration No. 20-0411530.

In the proposed structure, as a rotation member rotates due to cleansing water supplied from a bidet tank, the opening and closing of a spraying hole is repeated and the cleansing water is ejected, thereby reducing the amount of cleansing water consumed and increasing washing efficiency. The problem, however, is that since a certain amount of the cleansing water spews out at intervals, a user may feel pain and discomfort due to the water pressure of the cleansing water.

In an attempt to solve this problem, "VIBRATION DEVICE OF BIDET NOZZLE" has been proposed recently under Korea Utility Model Registration No. 20-0422546.

In the above vibration device of a bidet nozzle, a vibration part is built into a nozzle with a flow path, and a vibration member rotates according to a bidet button signal to vibrate the nozzle to eject cleansing water, widening the cleaning area and making it easier to clean. However, since the vibration part is integrated inside the nozzle, the vibration amplitude of the nozzle is small, which reduces cleaning power. Moreover, because the vibration member that causes vibration in the nozzle is mounted perpendicular to a nozzle pipe or in a perpendicular direction, there is a limit to giving dynamic action to the water stream ejected through a spraying hole.

DISCLOSURE

Technical Problem

The present disclosure is intended to solve the above problems occurring in the related art. An objective of the present disclosure is to provide a vibration motor with a washing nozzle, wherein the internal structure is simplified by mounting the washing nozzle in an empty space inside a motor housing, thereby mitigating noise during vibration and reducing manufacturing costs to achieve economic efficiency and increase productivity.

An objective of the present disclosure is to provide a vibration motor with a washing nozzle that effectively washes a subject by supplying various cleaning solvents, such as water, oil, powder, air, to the washing nozzle.

Technical Solution

In order to achieve the above mentioned objectives, there is provided a vibration motor with a washing nozzle including: a motor housing; a washing nozzle mounted on an inner center of the motor housing, rotated by a vibration part, and configured to clean a subject by using a cleaning solvent that is supplied to a water inlet part and spreads at a certain angle; front and rear covers coupled to front and rear of the motor housing; and the vibration part coupled to each side of the washing nozzle inside the motor housing and configured to provide vibration while rotating the washing nozzle forward and backward.

The motor housing may include: a body part having a through hole formed on an upper portion thereof so that the cleaning solvent is sprayed; a mounting hole formed in an inner center of the body part and where the washing nozzle is mounted; a coupling space formed on each side of the body part around the mounting hole and where the vibration part is coupled; and a fixing piece provided on each side of a rear end of the body part and having a fixing hole to fix the rear cover.

The washing nozzle may include: a nozzle body; and the water inlet part provided on a side of the nozzle body and into which the cleaning solvent is introduced, wherein a rotating shaft provided on the nozzle body may be coupled within the motor housing so that the nozzle body rotates, and the nozzle body may be formed by combining first and second bodies.

The motor housing may be in a stationary state, the washing nozzle may repeatedly rotate forward and backward within the mounting hole of the motor housing, and the water inlet part may include: a first water inlet part provided at an upper part of the side of the nozzle body and into which a cleaning solvent is introduced; and a second water inlet part provided at a lower part of the side of the nozzle body and into which a cleaning solvent is introduced.

A bearing may be further included, and the bearing may be fixed to the rear cover.

The front cover may be fixed to a front end of the motor housing by ultrasonic welding or insert molding, and the rear cover may have a fixing protrusion provided on each side thereof to be fixed to the fixing piece provided on the motor housing.

The vibration part may include: a stator mounted on each side of an interior of the body part; an insulator configured to secure the stator inside the motor housing; a coil wound around the stator; and a magnet mounted on a side of the first body and a side of the second body of the washing nozzle, wherein the stator and the insulator may be formed as one piece by insert injection, and an operation of the vibration part may cause the washing nozzle to rotate forward and backward repeatedly to generate vibration so that the cleaning solvent is sprayed while spreading in left and right directions from an injection hole.

Advantageous Effects

According to the present disclosure, by mounting a washing nozzle in an empty space inside a motor housing, the internal structure can be simplified, thereby mitigating noise during vibration and reducing manufacturing costs to achieve economic efficiency and increase productivity.

In addition, according to the present disclosure, by supplying various cleaning solvents, such as water, oil, powder, air, to a washing nozzle, a subject can be effectively washed.

DESCRIPTION OF DRAWINGS

FIG. 1 is a perspective view of a vibration motor with a washing nozzle according to an embodiment of the present disclosure;

FIG. 2 is an exploded perspective view of a vibration motor with a washing nozzle according to an embodiment of the present disclosure;

FIG. 3 is a side cross-sectional view of a vibration motor with a washing nozzle according to an embodiment of the present disclosure;

FIG. 4 is a cross-sectional plan view of a vibration motor with a washing nozzle according to an embodiment of the present disclosure;

FIG. 5 is a front cross-sectional view of a vibration motor with a washing nozzle according to an embodiment of the present disclosure;

FIG. 6 is a perspective view of a vibration motor with a washing nozzle according to another embodiment of the present disclosure; and FIG. 7 is a side cross-sectional view of a vibration motor with a washing nozzle according to another embodiment of the present disclosure.

MODE FOR INVENTION

Hereinafter, the present disclosure will be described in detail based on the attached drawings. FIG. 1 is a perspective view of a vibration motor with a washing nozzle according to an embodiment of the present disclosure, and FIG. 2 is an exploded perspective view of a vibration motor with a washing nozzle according to an embodiment of the present disclosure.

A vibration motor 100 with a washing nozzle according to an embodiment of the present disclosure includes: a motor housing 110; a washing nozzle 120 mounted on the inner center of the motor housing 110, rotated by a vibration part 150, and configured to clean a subject by using a cleaning solvent that is supplied to the side of a water inlet part 123 and spreads at a certain angle; front and rear covers 140 and 140' coupled to the front and rear of the motor housing 110; and a vibration part 150 coupled to each side of the washing nozzle 120 inside the motor housing 110 and configured to provide vibration while rotating the washing nozzle 120 forward and backward.

As shown in FIGS. 3 to 5, the motor housing 110 has a body part 111 in which a through hole 111*a* is formed on the upper portion thereof so that the cleaning solvent is sprayed, and a mounting hole 112 formed in the inner center of the body part 111 and where the washing nozzle 120 is mounted.

The mounting hole 112 is a space where the washing nozzle 120 is mounted, and is also a space where the washing nozzle 120 rotates forward and backward.

A coupling space 113 where the vibration part 150 is coupled is provided inside each side of the body part 111, and in order to form the coupling space 113, the front end of the body part 111 is opened.

A rotation space 114 is formed on each side of the rear end of the body part 111, and the rotation space on one side is formed downward about the center while the rotation space on the other side is formed upward about the center so that the washing nozzle 120 rotates forward and backward.

A fixing piece 114 is provided on each side of the rear end of the body part 111, and a fixing hole 114*a* is formed through the fixing piece 114 for coupling of the rear cover 140'.

In addition, the washing nozzle 120 includes a nozzle body 121 configured to be mounted on the mounting hole 112 of the motor housing 110. The nozzle body 121 consists of two parts, first and second bodies 121*a* and 121*b*, and the nozzle body 121 is completed by combining the first and second bodies 121*a* and 121*b*.

On one side of the nozzle body 121, the water inlet part 122 into which a cleaning solvent is introduced is provided. A rotating shaft 123 is provided on the nozzle body 121 so that the washing nozzle 120 rotates within the motor housing 110.

Only one water inlet part 122 may be provided in the central portion of one side of the nozzle body 121. The water inlet part 122 may be configured such that a first water inlet part 122*a* is provided on one upper side of the nozzle body 121 so that a cleaning solvent is introduced, and a second water inlet part 122*a* is provided on one lower side of the nozzle body 121 so that a cleaning solvent is introduced.

A first flow path provided in the first water inlet part 122*a* is for strong washing, and a second flow path provided in the second water inlet part 122*a* is for soft washing. The shape, diameter, and quantity of the first and second flow paths may be changed to suit a subject to be cleaned.

As shown in FIGS. 6 to 7, a bearing 124 may be mounted on the water inlet part 122, which is provided only in the central portion of one side of the nozzle body 121. The rotating shaft 123 is provided on the nozzle body 121, which is the other side of the bearing 124, and the bearing 124 is mounted on the inside of the rear cover 140' fixed to the rear end of the motor housing 110 and guides the rotation of the washing nozzle 120 stably and quietly.

In addition, the front cover 140 is closed to prevent corrosion by preventing moisture from penetrating into the vibration part 150 mounted inside the motor housing 110, and is fixed by ultrasonic welding or insert molding.

The rear cover 140' has a fixing protrusion 141 provided on each side thereof to be fixed to the fixing hole 114*a* of the fixing piece 114 formed at the rear end of the motor housing 110.

In addition, the vibration part 150 consists of a stator 151, an insulator 152, a coil 153, and a magnet 154. The stator 151 is mounted in the coupling space 113 formed on each side of the interior of the body part 111.

The insulator 152 is coupled to the front and rear ends of the stator 151 and fixed inside the motor housing 110.

The stator 151 and the insulator 152 are formed as one piece by insert injection, and the coil 153 is wound around the stator 151.

The magnet 154 is fixed to a side of a first body 121*a* and a side of a second body 121*b* of the washing nozzle 120. Thus, due to the operation of the vibration part 150 configured as described above, the washing nozzle 120 rotates forward and backward about the rotating shaft 123, generating vibration.

As vibration is generated in the washing nozzle 120, when a cleaning solvent supplied through the water inlet part 122 is sprayed into an ejection hole, the spray range is expanded, thereby increasing cleaning efficiency.

When the vibration part 150 is operated, the washing nozzle 120 rotates forward and backward about the rotating shaft 123 and generates vibration. At this time, since only the washing nozzle 120 rotates and the motor housing 110 does not rotate, the structure as that of a conventional vibration motor having the weight of a metal rotating shaft, the weight of a permanent magnet fixture, and the weight of a shaft and a connecting member is eliminated, thereby significantly mitigating noise during vibration, simplifying the structure of the vibration motor, and reducing manufacturing costs to achieve economic efficiency and improve productivity.

The cleaning solvent includes water, oil, various powders, and compressed air.

That is, the present disclosure may be applied to a bidet nozzle or a dishwasher nozzle by supplying water as a cleaning solvent to the water inlet part 122 or the first and second water inlet parts 122*a* and 122*b* of the washing nozzle 120 and vibrating spraying. In this way, oil, alcohol, thinner, or gasoline may be vibrating-sprayed to efficiently remove oil stains, powder such as glass or sand powder may be vibrating-sprayed to clean the surface of a corroded steel plate, and compressed air may be sprayed to effectively remove foreign substances or dust attached to clothing or skin when entering a clean area or a dust-proof area.

As described above, although the present disclosure has been described with limited examples and drawings, the terms and words used in the specification and claims should not be construed as limited to their ordinary or dictionary meanings, but should be construed with meanings and concepts consistent with the technical idea of the present disclosure.

Therefore, the embodiments described in this specification and the configurations shown in the drawings are only one embodiment of the present disclosure and do not represent the entire technical idea of the present disclosure, and accordingly, it should be understood that various equivalents and modifications may be made without departing from the scope of the present disclosure.

The invention claimed is:

1. A vibration motor with a washing nozzle, comprising:
- a motor housing (110);
- a washing nozzle (120) mounted on an inner center of the motor housing (110), rotated by a vibration part (150), and configured to clean a subject by using a cleaning solvent that is supplied to a water inlet part (123) and spreads at a certain angle;
- front and rear covers (140) and (140') coupled to front and rear of the motor housing (110); and
- the vibration part (150) coupled to each side of the washing nozzle (120) inside the motor housing (110) and configured to provide vibration while rotating the washing nozzle (120) forward and backward, wherein the motor housing (110) comprises:
- a body part (111) having a through hole (111*a*) formed on an upper portion thereof so that the cleaning solvent is sprayed;
- a mounting hole (112) formed in an inner center of the body part (111) and where the washing nozzle (120) is mounted;
- a coupling space (113) formed on each side of the body part (111) around the mounting hole (112) and where the vibration part (150) is coupled; and
- a fixing piece (114) provided on each side of a rear end of the body part (111) and having a fixing hole (114*a*) to fix the rear cover (140').

2. The vibration motor of claim 1, wherein the washing nozzle (120) comprises:
- a nozzle body (121); and
- the water inlet part (122) provided on a side of the nozzle body (121) and into which the cleaning solvent is introduced, wherein a rotating shaft (123) provided on the nozzle body (121) is coupled within the motor housing (110) so that the nozzle body (121) rotates, and the nozzle body (121) is formed by combining first and second bodies (121*a*) and (121*b*).

3. The vibration motor of claim 2, wherein the motor housing (110) is in a stationary state, the washing nozzle (120) repeatedly rotates forward and backward within the mounting hole (112) of the motor housing (110), and the water inlet part (122) comprises:
- a first water inlet part (122*a*) provided at an upper part of the side of the nozzle body (121) and into which a cleaning solvent is introduced; and
- a second water inlet part (122*a*) provided at a lower part of the side of the nozzle body (121) and into which a cleaning solvent is introduced.

4. The vibration motor of claim 2, further comprising:

a bearing (124) mounted on the water inlet part (122), wherein the bearing (124) is fixed to the rear cover (140').

5. The vibration motor of claim 1, wherein the front cover (140) is fixed to a front end of the motor housing (110) by ultrasonic welding or insert molding, and the rear cover (140') has a fixing protrusion (141) provided on each side thereof to be fixed to the fixing piece (114) provided on the motor housing (110).

6. The vibration motor of claim 1, wherein the vibration part (150) comprises:
- a stator (151) mounted on each side of an interior of the body part (111);
- an insulator (152) configured to secure the stator (151) inside the motor housing (110);
- a coil (153) wound around the stator (151); and
- a magnet (154) mounted on a side of the first body (121*a*) and a side of the second body (121*b*) of the washing nozzle (120), wherein an operation of the vibration part (150) causes the washing nozzle (120) to rotate forward and backward repeatedly to generate vibration so that the cleaning solvent is sprayed while spreading in left and right directions from an injection hole.

7. The vibration motor of claim 6, wherein the stator (151) and the insulator (152) are formed as one piece by insert injection.

* * * * *